United States Patent
Suzuki et al.

(10) Patent No.: US 7,290,529 B2
(45) Date of Patent: Nov. 6, 2007

(54) SPARK ADVANCE CONTROLLER AND PRODUCTION MACHINE OF SPARK ADVANCE CONTROL LOGIC IN INTERNAL COMBUSTION ENGINE

(75) Inventors: Kunihiko Suzuki, Chiyoda-ku (JP); Taizo Miyazaki, Chiyoda-ku (JP); Mamoru Nemoto, Chiyoda-ku (JP); Takuya Shiraishi, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 11/333,174

(22) Filed: Jan. 18, 2006

(65) Prior Publication Data

US 2006/0157029 A1    Jul. 20, 2006

(30) Foreign Application Priority Data

Jan. 19, 2005    (JP)    ............................. 2005-011106

(51) Int. Cl.
    F02P 5/15    (2006.01)
(52) U.S. Cl. ............................. 123/406.32; 123/406.33; 123/406.65
(58) Field of Classification Search ........... 123/406.23, 123/406.26, 406.32, 406.33, 406.35, 406.65; 701/105–106
    See application file for complete search history.

(56) References Cited

U.S. PATENT DOCUMENTS

| 4,063,538 | A | | 12/1977 | Powell et al. |
|---|---|---|---|---|
| 5,099,683 | A | | 3/1992 | Remboski, Jr. et al. |
| 5,887,568 | A | | 3/1999 | Takeyama et al. |
| 6,236,908 | B1 | * | 5/2001 | Cheng et al. .................. 701/1 |
| 6,553,949 | B1 | | 4/2003 | Kolmanovsky et al. |
| 6,925,373 | B2 | * | 8/2005 | La Rosa et al. ............ 701/109 |
| 6,970,781 | B1 | * | 11/2005 | Chen et al. ................. 701/111 |
| 7,142,975 | B2 | * | 11/2006 | Wang et al. ................ 701/114 |
| 2004/0267430 | A1 | | 12/2004 | Ancimer |

FOREIGN PATENT DOCUMENTS

| DE | 43 26 949 A1 | 2/1995 |
|---|---|---|
| DE | 195 49 649 B4 | 6/2004 |
| JP | 10-30535 | 3/1998 |
| JP | 2003-049758 | 2/2003 |
| JP | 2004-100495 | 4/2004 |

OTHER PUBLICATIONS

European Search Report dated Dec. 6, 2006 (six (6) pages).

* cited by examiner

Primary Examiner—Hai Huynh
(74) Attorney, Agent, or Firm—Crowell & Moring LLP

(57) ABSTRACT

A spark advance controller capable of controlling spark advance in an internal combustion engine with high accuracy without requiring a larger number of data maps and performing laborious optimization tests using an actual engine. In the spark advance controller, map data for controlling the spark advance is computed by a numerical simulator simulating an internal combustion engine, and the map data for spark advance control is approximated with a regression model. The spark advance is computed by using the regression model depending on the detected operating conditions.

9 Claims, 12 Drawing Sheets

SPARK ADVANCE CONTROLLER AND PRODUCTION MACHINE OF SPARK ADVANCE CONTROL LOGIC IN INTERNAL COMBUSTION ENGINE

BACKGROUND OF THE INVENTION

1. Field of the Invention

The present invention relates to a spark advance controller and a production machine of spark advance control logic in an internal combustion engine. More particularly, the present invention relates to a spark advance controller and a production machine of spark advance control logic, which are suitable for spark advance control in a variably controlled internal combustion engine.

2. Description of the Related Art

In an ECU (Engine Control Unit) for an electronically controlled internal combustion engine, for the purpose of control of ignition timing (spark advance), a spark advance at which torque is maximized under predicted operating conditions, i.e., an MBT (Minimum Spark Advance for Best Torque), is stored in a memory in the form of a spark advance map in which each axis represents one of an engine speed and a load.

The ECU decides an optimum spark advance by referring to the spark advance map depending on the operating conditions and the ambient environment of an internal combustion engine, which change every moment, and executes control such that a gas mixture is ignited in a cylinder by an igniter at the decided spark advance. With that control, the ignition is performed at the timing of producing maximum torque without causing knock.

The spark advance map stored in the memory of the ECU is produced in the development stage of the internal combustion engine based on optimization tests using an actual engine.

In recent years, from the viewpoints of cleaning the exhaust and reducing the fuel consumption, a variably controlled internal combustion engine has been widely employed in which operating characteristics of actuators in the internal combustion engine can be variously changed depending on the operating conditions and the ambient environment.

There have been developed various types of internal combustion engines, for example, one in which the fuel concentration in a gas mixture is reduced to perform lean combustion in a particular operating range, another in which exhaust gas is supplied to an engine combustion chamber through EGR (Exhaust Gas Recirculation), and still another which includes a variably setting valve mechanism capable of optionally changing operating characteristics of intake and exhaust valves.

Because the fuel concentration (air/fuel ratio of the gas mixture), the EGR concentration, and the operating characteristics of the intake and exhaust valves, etc. cause changes in the burning state of the gas mixture within a cylinder, the spark advance has to be properly changed depending on a combination of those control parameters.

When the known optimization tests using an actual engine are performed on the above-mentioned internal combustion engines, a problem arises in point of increasing the development term and the development cost. Another problem is that, in order to make reference to respective spark advance maps with regards to all of predicted operation conditions, data maps having a very large capacity have to be incorporated in the ECU and the memory capacity of the ECU is increased correspondingly.

Against the background described above, a spark advance controller is proposed which computes various variables, such as the mass of fuel gas (gas mixture) supplied to the engine combustion chamber and the burning velocity of the gas mixture in accordance with physical models depending on an engine speed and a load, and then computes the MBT based on the computed variables (see, e.g., Patent Reference 1: JP-A-10-30535).

Also, another spark advance controller is proposed which computes various variables, such as the internal energy of fuel gas inside a cylinder at the start of compression stroke of an internal combustion engine, the piston compression work, the energy loss through wall surfaces, and the burning velocity of the gas mixture in accordance with physical models, and then computes a knock limit based on the computed variables (see, e.g., Patent Reference 2: JP-A-2003-46758).

In those spark advance controllers, during the operation of the internal combustion engine, the MBT or the knock limit is computed in the ECU online (real time) by using a plurality of physical models that describe the burning states in the engine combustion chamber. Thus, those controllers need neither the laborious optimization tests using an actual engine, nor a large number of data maps.

Further, there is known a control unit including numerical maps for various control parameters in an ECU and controlling the internal combustion engine while referring to the numerical maps based on engine operating states, wherein the numerical maps are obtained with a numerical simulator simulating the internal combustion engine (see, e.g., Patent Document 3: JP-A-2004-100495). With such a control unit, even when a large number of numerical maps are required, those numerical maps can be produced by using the numerical simulator and therefore the optimization tests using an actual engine can be omitted.

However, processing based on a physical model needs a much larger number of processing steps than that based on a map search, and the ECU is required to have a high processing capability when the ECU executes the processing during the engine operation.

Also, even in the case of producing the numerical maps by using the numerical simulator separately provided, when the internal combustion engine includes many control parameters, the number of the numerical maps is greatly increased and a memory having a very large capacity has to be incorporated in the ECU.

Thus, although the above-described techniques can noticeably reduce the number of steps required in the optimization tests using an actual engine and is expected to cut the development cost, those techniques still have a problem from the practical point of view in greatly increasing the cost of the ECU.

SUMMARY OF THE INVENTION

An object of the present invention is to, even in a variably controlled internal combustion engine capable of optionally changing operating characteristics of components of the internal combustion engine, cut the number of steps of optimization tests using an actual engine, to compute an optimum spark advance in an ECU with high accuracy, and to execute optimum spark advance control without greatly increasing the number of processing steps and a memory capacity.

To achieve the above object, the present invention provides a spark advance controller in an internal combustion engine, the controller including a unit for detecting operating conditions of the internal combustion engine, wherein the controller stores a regression model approximating map data for spark advance control, and decides a spark advance with computation using the regression model depending on the detected operating conditions, thereby performing the spark advance control.

In the spark advance controller in the internal combustion engine according to the present invention, preferably, the regression model is a polynominal made up of at least one of a term including only an engine speed, a term including only a load, a term including only a modification variable, an interaction term including the engine speed and the load, an interaction term including the modification variable and the engine speed, an interaction term including the modification variable and the load, and an interaction term including the engine speed, the load and the modification variable.

In the spark advance controller in the internal combustion engine according to the present invention, preferably, the regression model is divided into a reference function and a modification function, and the spark advance is decided as the sum of a spark advance reference value computed by the reference function and a spark advance modification value computed by the modification function.

In the spark advance controller in the internal combustion engine according to the present invention, preferably, the reference function is a polynominal made up of at least one of the term including only the engine speed, the term including only the load, the interaction term including the engine speed and the load, and the modification function is a polynominal made up of at least one of the term including only the modification variable, the interaction term including the modification variable and the engine speed, the interaction term including the modification variable and the load, and the interaction term including the engine speed, the load and the modification variable.

In the spark advance controller in the internal combustion engine according to the present invention, preferably, the modification variable includes an operating characteristic value of an intake valve, and the spark advance modification value is computed based on the operating characteristic of the intake valve by using the modification function with the operating characteristic value of the intake valve set as the modification variable.

In the spark advance controller in the internal combustion engine according to the present invention, preferably, the modification variable includes an intake temperature, and the spark advance modification value is computed based on the intake temperature by using the modification function with the intake temperature set as the modification variable.

In the spark advance controller in the internal combustion engine according to the present invention, preferably, the modification variable includes an equivalence ratio, and the spark advance modification value is computed based on the equivalence ratio by using the modification function with the equivalence ratio set as the modification variable.

In the spark advance controller in the internal combustion engine according to the present invention, preferably, the modification variable includes an EGR (Exhaust Gas Recirculation) rate, and the spark advance modification value is computed based on the EGR rate by using the modification function with the EGR rate set as the modification variable.

In the spark advance controller in the internal combustion engine according to the present invention, preferably, when there are a plurality of modification variables, the spark advance modification value is computed based on each of the modification variables, and the total sum of the respective spark advance modification values computed for all the modification variables is set as a total spark advance modification value.

In the spark advance controller in the internal combustion engine according to the present invention, preferably, the reference function is defined as a dual and third-degree polynominal in which the engine speed and the load are independent variables, and the modification function is defined as a triple and third-degree polynominal in which the engine speed, the load and the modification variable are independent variables.

In the spark advance controller in the internal combustion engine according to the present invention, preferably, the spark advance is decided as an MBT (Minimum spark advance for Best Torque) computed by using an approximated MBT regression model and a knock retard computed by using an approximated knock-retard regression model.

To achieve the above object, the present invention also provides a production machine of spark advance control logic, wherein map data for spark advance control is computed by a numerical simulator simulating an internal combustion engine, and the map data is approximated with a regression model to produce control logic for spark advance.

In the production machine of spark advance control logic according to the present invention, preferably, each term of the regression model is multiplied by a partial regression coefficient decided to more accurately approximate the map data, and a degree of influence of the term upon the spark advance, which is multiplied by the partial regression coefficient, is evaluated based on magnitudes of respective absolute values of the partial regression coefficients, and if the degree of influence upon the spark advance is not larger than a predetermined value, the relevant term multiplied by the relevant partial regression coefficient is omitted from the regression model.

In the production machine of spark advance control logic according to the present invention, preferably, the map data for spark advance control is constituted by an MBT map and a knock retard map, the MBT map is approximated with one regression model, and the knock retard map is approximated with another regression model.

In the production machine of spark advance control logic according to the present invention, preferably, the map data for spark advance control is subdivided into plural groups depending on individual operating ranges, and each subdivided group of the map data is approximated with a regression model.

In the production machine of spark advance control logic according to the present invention, preferably, the number of degrees of the regression model is set depending on demanded control accuracy.

In the production machine of spark advance control logic according to the present invention, preferably, the numerical simulator computes at least a cylinder volume, computes change of gas mass in a cylinder during a gas exchange process, computes heat generated in a burning process, computes a heat loss, determines the occurrence of knock, computes a relationship between the cylinder pressure and the cylinder volume per cycle based on the numerical simulation, computes indicated torque based on the relationship between the cylinder pressure and the cylinder volume, computes an MBT based on the relationship between the indicated torque and the spark advance, and computes a knock limit based on a result of the determination as to the occurrence of knock.

According to the spark advance controller of the present invention, the spark advance controller stores a regression model approximating map data for spark advance control, and decides the spark advance with computations using the regression model depending on the detected operating conditions, thereby performing the spark advance control. In the spark advance controller, therefore, an ECU is required neither to store any maps, nor to compute physical models having a large computation load. Hence, the memory capacity of the spark advance controller can be reduced in comparison with that required in the case of a map search, and the computation load of the spark advance controller can also be reduced in comparison with that required in the case of directly computing the physical models.

DESCRIPTION OF THE PREFERRED EMBODIMENTS (Overall Construction of Internal Combustion Engine)

Figure 1:
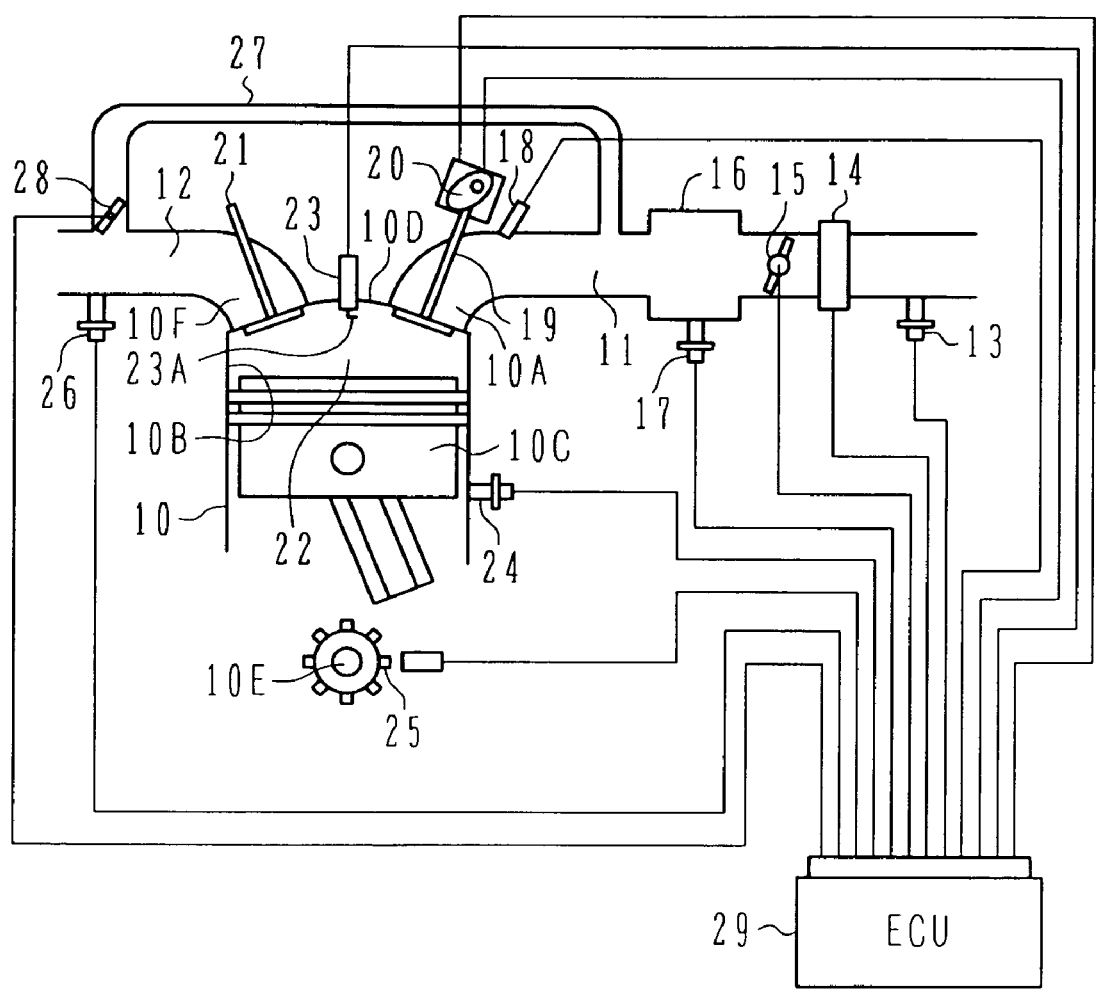
FIG. 1 is a schematic view showing the overall construction of an electronically controlled internal combustion engine to which a spark advance controller of the present invention is applied.

First, one embodiment of the overall construction of an electronically controlled internal combustion engine to which a spark advance controller of the present invention is applied will be described with reference to FIG. 1.

An intake passage 11 and an exhaust passage 12 are communicated respectively with an intake port 10A and an exhaust port 10F of an internal combustion engine (cylinder block) 10.

An intake temperature sensor 13 is mounted to the intake passage 11. Also, an airflow sensor 14 is mounted to the intake passage 11 downstream of the intake temperature sensor 13.

A throttle valve 15 is disposed downstream of the airflow sensor 14. The throttle valve 15 is an electronically controlled throttle valve capable of controlling a throttle opening independent of the amount of depression of an accelerator.

A surge tank 16 is communicated with the intake passage 11 at a position downstream of the throttle valve 15. An intake-pipe inner pressure sensor 17 is mounted to the surge tank 16. A fuel injection valve 18 for injecting fuel toward the intake port 10A is disposed downstream of the surge tank 16.

The internal combustion engine 10 includes an intake valve 19 with a variably setting valve mechanism for making the valve opening phase (timing) variable. The intake valve 19 serves to open and close the intake port 10A, and a cam angle sensor 20 for detecting the valve opening phase is mounted to the variably setting valve mechanism of the intake valve 19.

The internal combustion engine 10 includes a piston 10C being able to reciprocally move in a cylinder bore 10B, and a combustion chamber 22 is defined between the piston 10C and a cylinder head 10D.

A spark plug 23 is mounted to the cylinder head 10D such that an electrode portion 23A of the spark plug 23 is exposed to the combustion chamber 22. A knock sensor 24 for detecting the occurrence of knock is mounted to the internal combustion engine 10. A crank angle sensor 25 is mounted to a crankshaft 10E.

The exhaust port 10F of the internal combustion engine 10 is opened and closed by an exhaust valve 21. An A/F sensor 26 is mounted in the exhaust passage 12. Also, an EGR pipe 27 for returning exhaust gas from the exhaust passage 12 to the intake passage 11 is connected to the exhaust passage 12. An EGR valve 28 for adjusting an EGR rate is disposed in a passage of the EGR pipe 27.

The spark advance controller of this embodiment includes an ECU (Electronic Control Unit) 29. The above-mentioned various sensors are connected to the ECU 29.

Various actuators, such as the throttle valve 15, the fuel injection valve 18, the intake valve 19 with the variably setting valve mechanism, and the EGR valve 28, are controlled by the ECU 29. Also, the operating state of the internal combustion engine 10 is detected based on signals inputted from the above-mentioned various sensors, and the spark plug 23 is ignited at the ignition timing (spark advance) that has been decided by the ECU 29 depending on the operating state.

(Process from Production of Spark Advance Control Logic to Execution of Spark Advance Control)

Figure 2:
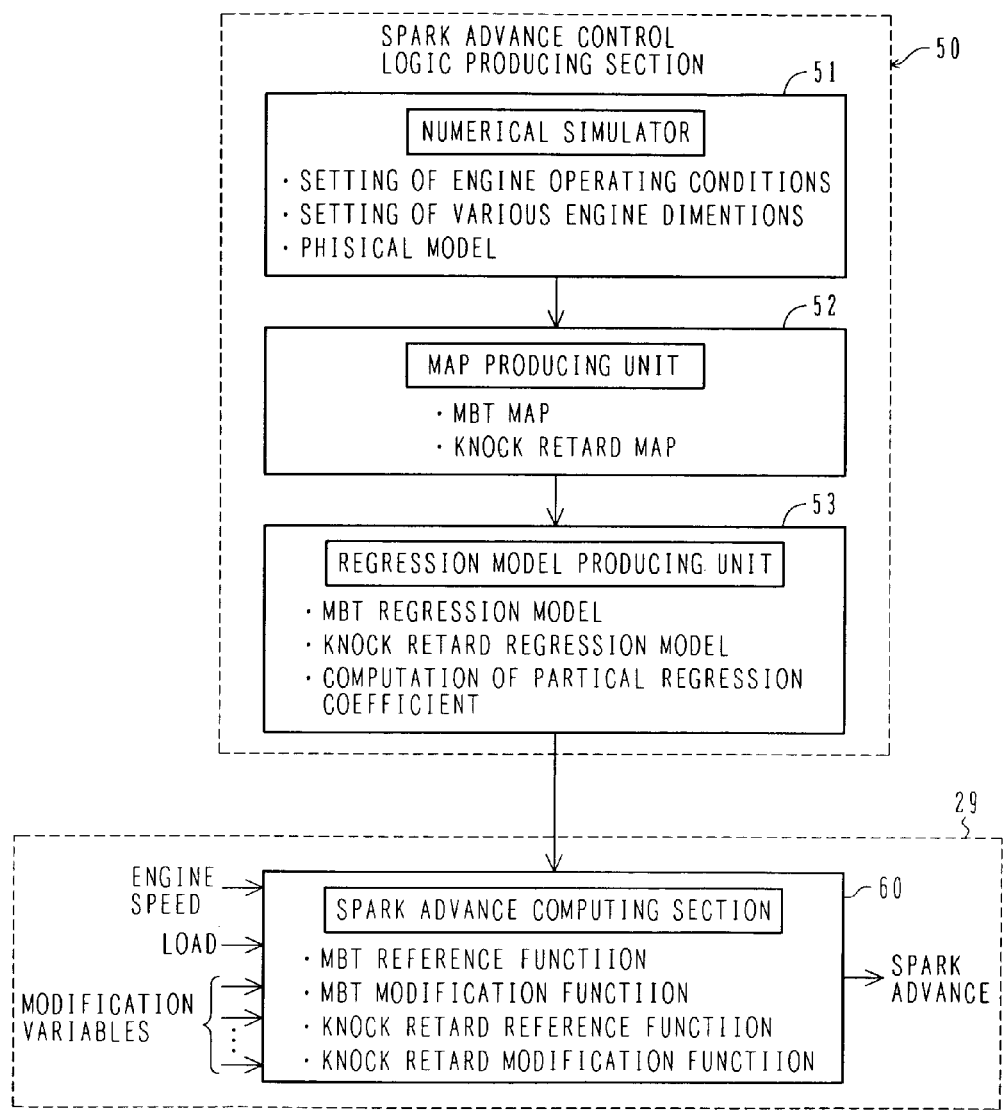
FIG. 2 is a block diagram showing a production machine of spark advance control logic according to the present invention and a spark advance computing unit included in the internal combustion engine.

A process from production of spark advance control logic to execution of spark advance control by the ECU 29 will be described below with reference to FIG. 2.

A spark advance control logic producing section 50 comprises a numerical simulator 51, a map producing unit 52, and a regression model producing unit 53.

In the production of the spark advance control logic, the numerical simulator 51 first computes the pressure and temperature in the cylinder of the internal combustion engine to be controlled. In this computing process, engine operating conditions, various engine dimensions, and physical models for determining physical phenomena occurred in the cylinder are taken into consideration. The computing process executed in the numerical simulator 51 will be described in detail later with reference to FIG. 3.

Then, the map producing unit 52 produces an MBT map and a knock retard map by obtaining the MBT and the knock limit under various operating conditions based on the relationships between the cylinder volume and the pressure and temperature in the cylinder, which have been determined by the numerical simulator 51.

Then, the regression model producing unit 53 approximates the thus-formed MBT map and the knock retard map by producing respective regression models.

The term "regression model" means a plural and multi-degree polynominal in which map data is a dependent variable and a plurality of axes constituting a map are independent variables. Each term in the plural and multi-degree polynominal is multiplied by a partial regression coefficient. The partial regression coefficient indicates the degree of influence upon the dependent variable of each term in the regression model.

In the step of producing the regression model, a plural and multi-degree polynominal most closely approximating the map data is selected taking into account a change rate of the map data for each independent variable. The partial regression coefficient by which each term is multiplied is decided by the least square method to be a value that most closely approximates the map data.

The regression model and the partial regression coefficient decided by the spark advance control logic producing section 50 are stored in a spark advance computing section 60 with respect to the MBT and the knock retard. The spark advance control logic producing section 50 is practically constituted by the ECU 29.

The ECU 29 detects the engine operating state based on not only signals from the various sensors, but also signals for driving the various actuators, those signals being sensed during the vehicle operation. The following variables are taken into consideration in detecting the operating conditions.

The engine speed is detected based on a pulse signal outputted from the crank angle sensor 25 per unit time. The engine load can be determined by detecting the pressure in the intake pipe.

A manner of detecting the engine load is not limited to the above-mentioned one of detecting the pressure in the intake pipe, and the engine load may be determined based on a signal indicating one of the intake air amount, the charging efficiency, the air/fuel ratio, and the opening of the throttle valve per cycle. As an alternative, a torque sensor may be mounted on an axle to directly detect generated torque.

As modification variables, characteristic values in operation of the intake valve, the intake temperature, the equivalence ratio, the external EGR rate, etc. are taken into consideration. The characteristic values in operation of the intake valve include the valve opening timing of the intake valve, the overlap period between the intake valve opening timing and the exhaust valve opening timing, etc.

The intake temperature can be detected by the intake temperature sensor 13. The equivalence ratio can be obtained based on a fuel injection valve drive signal generated by the ECU, the intake air amount detected by the airflow sensor 14, and the engine speed. The external EGR rate can be estimated by detecting the opening angle of the EGR valve 28, the engine speed, and the pressure in the intake pipe. As an alternative, a sensor for detecting a flow rate may be disposed in the EGR pipe 27 to directly detect the EGR rate.

The above-mentioned operating conditions, such as the engine speed, the load, the characteristic values in operation of the intake valve, the intake temperature, the equivalence ratio, and the external EGR rate, are inputted to the spark advance computing section 60 in the ECU.

The spark advance computing section 60 includes an MBT reference function for computing an MBT reference value, an MBT modification function for computing an MBT modification value, a knock retard reference function for computing a knock retard reference value, and a knock retard modification function for computing a knock retard modification value.

The spark advance computing section 60 successively computes the MBT reference value, the MBT modification value, the knock retard reference value, and the knock retard modification value by using the respective functions, and then outputs the spark advance corresponding to the engine operating conditions.

With the above-described process of computing the spark advance by the numerical simulator 51, forming the regression model to approximate the map data, and computing the spark advance based on the regression model depending on the operating conditions of the internal combustion engine, the ECU 29 is required to neither include the data map for the spark advance therein, nor to compute physical models having a large computation load.

Accordingly, the memory capacity of the ECU 29 can be reduced in comparison with that required in the case of a map search, and the computation load of the ECU 29 can also be reduced in comparison with that required in the case of directly computing the physical models.

(Numerical Simulation)

Figure 3:
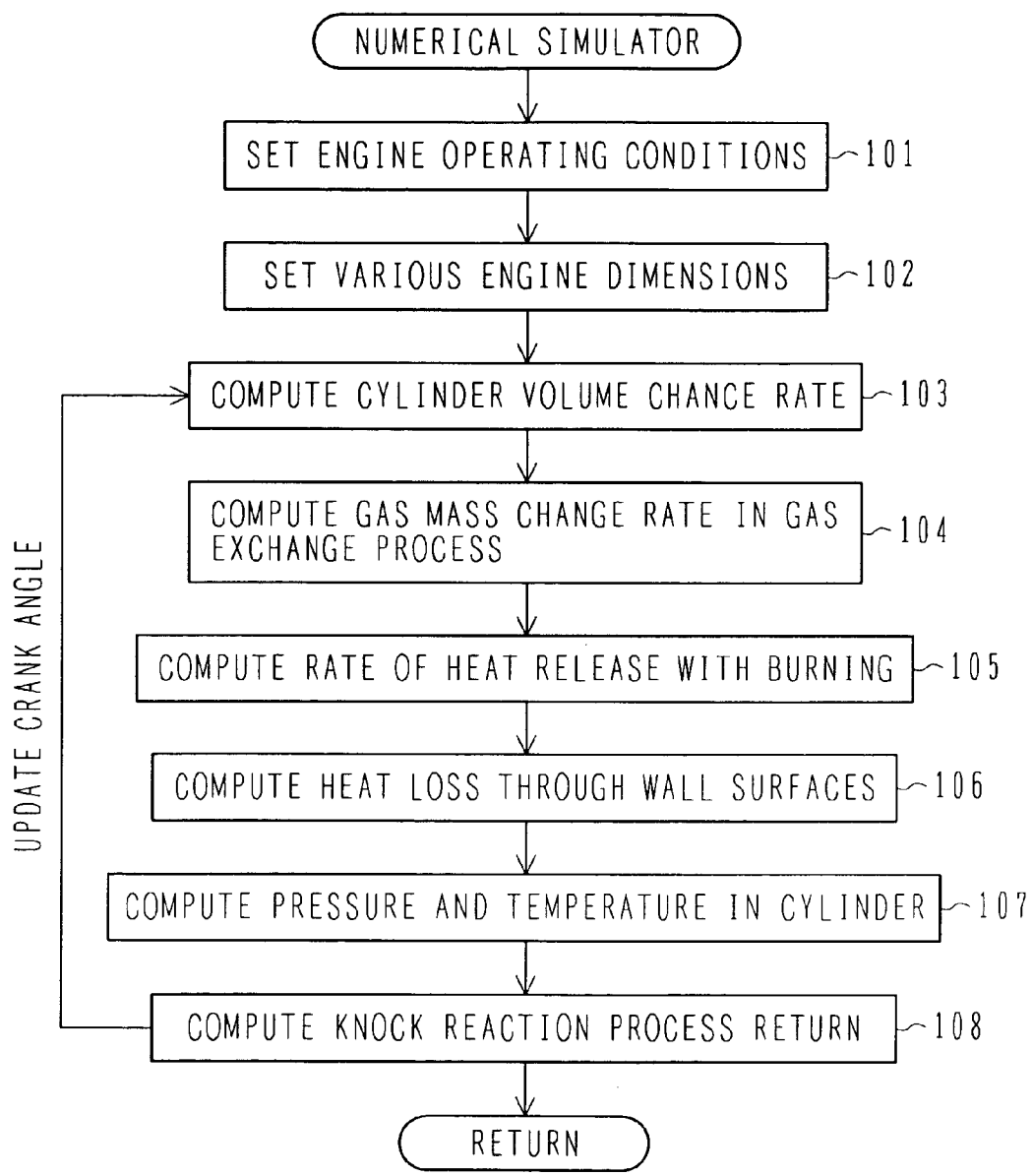
FIG. 3 is a flowchart showing one embodiment of numerical simulation executed in the production machine of spark advance control logic according to the present invention.

The computing process executed by the numerical simulator 51 will be described below with reference to FIG. 3.

First, in step 101, the engine operating conditions are inputted (set). The engine operating conditions include the engine speed, the pressure in the intake pipe, the characteristic in operation of the intake valve, the intake temperature, the equivalence ratio, the external EGR rate, the wall surface temperature, etc.

Then, in step 102, the various engine dimensions are set. The various engine dimensions include the bore, the stroke, the compression ratio, the shape of the combustion chamber, etc. In addition, the profile dimensions of the intake and exhaust valves, the valve opening characteristics of those valves, etc. are also set. In the case of taking into account the intake and exhaust systems, the inner diameters and pipe lengths of the intake and exhaust valves are further set.

Changes of the pressure and temperature in the cylinder are computed by executing computing steps 103 to 108, described below, per unit crank angle in a repeated manner under the above-described conditions.

In step 103, the numerical simulator 51 computes a cylinder volume change rate depending on a piston motion. The cylinder volume is determined taking into account at least the crank angle, the bore, the stroke, the compression ratio, and the ratio of the connecting rod length to the crank radius.

In step 104, the numerical simulator 51 computes a change rate of gas mass in the cylinder during the gas exchange process. In step 104, it is first determined based on the crank angle whether the engine is in the gas exchange (intake or exhaust) process.

If the engine is in the gas exchange process, the mass of gas flowing into and out through the opening of each valve is obtained from the opening area of each valve and the relationship of the pressure in the intake pipe and the pressure in the exhaust pipe versus the pressure in the cylinder (cylinder pressure).

The larger a ratio of the pressure in the intake pipe to the cylinder pressure and the larger the opening area of the intake valve, the larger is a flow rate of the gas passing through the intake valve. The larger a ratio of the pressure in the exhaust pipe to the cylinder pressure and the larger the opening area of the exhaust valve, the larger is a flow rate of the gas passing through the exhaust valve.

At that time, the computed flow rate of the gas passing through the intake valve is not limited to the flow rate of the gas flowing forward, i.e., in the direction from the intake valve toward the cylinder. Under the operating condition in which the opening of the throttle valve is narrowed and the pressure in the intake pipe is lowered, the cylinder pressure may exceed the pressure in the intake pipe. Even in such a case, the intake flow rate can be accurately computed in consideration of a backward gas flow toward the intake valve from the cylinder as well.

The computations in step 104 for the mass of the gas passing through the intake valve and the mass of the gas passing through the exhaust valve in the gas exchange process will be described in more detail below with reference to FIGS. 4A-4D.

Figure 4A:
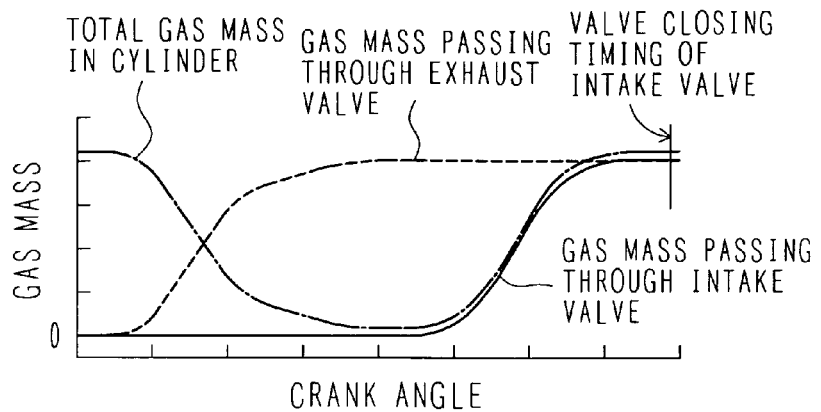
FIG. 4A is a graph showing a cumulative value of gas mass passing through an intake valve, a cumulative value of gas mass passing through an exhaust valve, and total gas mass in a cylinder.

FIG. 4A shows a cumulative value of the gas mass passing through the intake valve, a cumulative value of the gas mass passing through the exhaust valve, and the total gas mass in the cylinder.

Figure 4B:
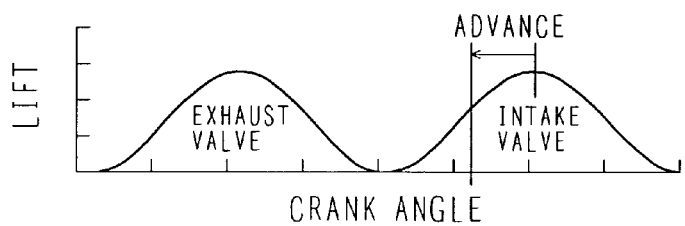
FIG. 4B is a graph showing lift changes of intake and exhaust valves.

FIG. 4B shows lift changes of the intake and exhaust valves, which provide the characteristics shown in FIG. 4A. In the internal combustion engine 10, the valve opening phase of the intake valve 19 is advanced depending on the operating conditions to set an overlap period between the valve opening period of the intake valve 19 and the valve opening period of the exhaust valve 21. Thus, a spit-back of burnt gas into the intake pipe is caused so as to suck the bunt gas again into the cylinder, thereby increasing a proportion of the burnt gas in the cylinder.

Figure 4C:
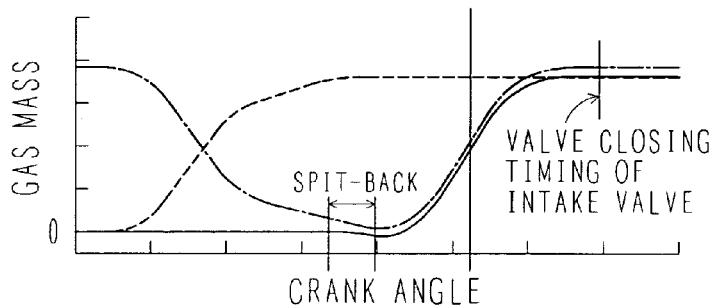
FIG. 4C is a graph showing a cumulative value of gas mass passing through the intake valve, a cumulative value of gas mass passing through the exhaust valve, and total gas mass in the cylinder when an overlap period is set.
Figure 4D:
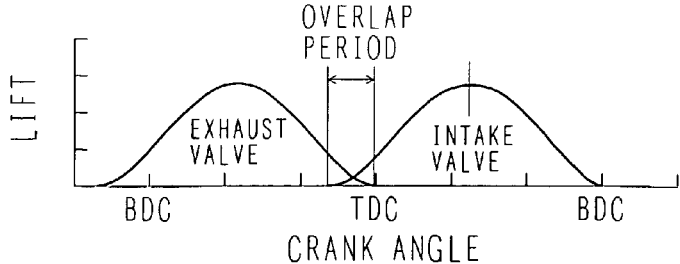
FIG. 4D is a graph showing lift changes of the intake and exhaust valves when the overlap period is set.

FIGS. 4C and 4D show respectively changes of the gas mass and the lift, by way of example, when the valve opening phase of the intake valve 19 is advanced from that in FIGS. 4A and 4B to set the overlap period. With the computing manner of this embodiment, change of an internal EGR rate resulting when the variably setting valve mechanism of the intake valve is operated can be accurately computed in consideration of the spit-back of the burnt gas in the overlap period as well.

Figure 5A:
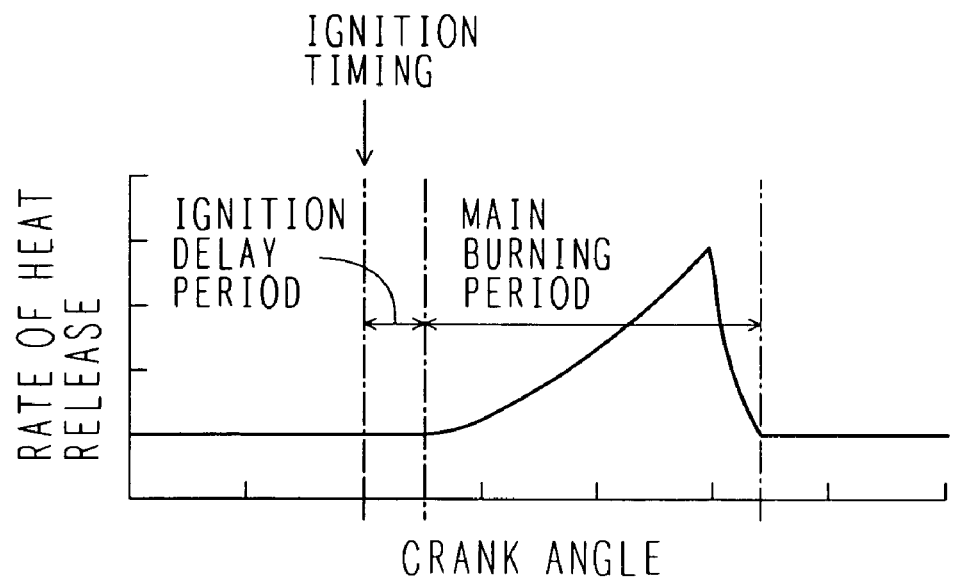
FIG. 5A is a graph showing a rate of heat release after spark ignition.
Figure 5B:
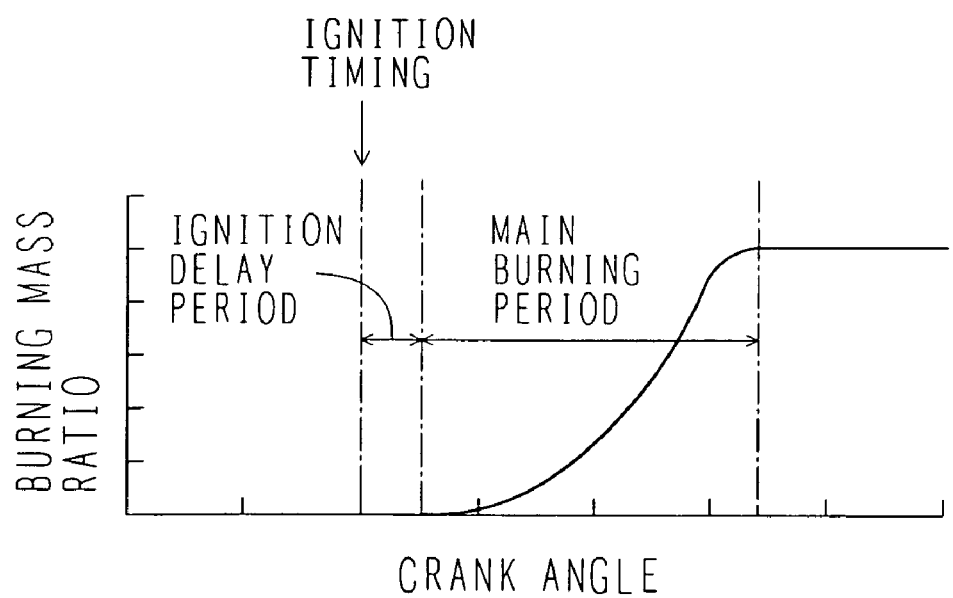
FIG. 5B is a graph showing change of a burning mass proportion.

Then, in step 105, the numerical simulator 51 computes a rate of heat release with burning. FIGS. 5A and 5B show respectively the rate of heat release after spark ignition and change of a burning mass proportion for explaining the burning process of the internal combustion engine.

The burning in the internal combustion engine generates no appreciable heat during a period immediately after the spark ignition in terms of the crank angle ranging from 1 to 10°. Such a period is called an ignition delay period. The length of the ignition delay period depends on the temperature and pressure in the combustion chamber, the gas flow characteristic and gas composition near the spark plug, and spark energy.

After the spark ignition, a flame kernel is formed in the electrode portion during the ignition delay period. After the lapse of the ignition delay period, a flame propagates over the whole of the combustion chamber. Most of the amount of heat to be generated from the gas mixture supplied to the cylinder heat is generated at that time. This subsequent period is called a main burning period. During the main burning period, a profile of the rate of heat release is dominated by the laminar burning velocity and the amount of the generated heat based on the gas flow characteristic and gas composition in the combustion chamber, the density of the not-burnt gas, and the flame surface area depending on the shape of the combustion chamber and the burning mass proportion.

Because the ignition delay period and the main burning period are dominated by different affecting factors, the step of computing the rate of heat release with the burning computes respective rates of heat release during those period separately from each other. As a result, the total rate of heat release in the internal combustion engine can be accurately computed even under the different operation conditions.

As factors representing the gas composition in the cylinder, the equivalence ratio of the gas mixture, the external EGR rate, and the internal EGR rate that is determined in consideration of the spit-back, are inputted. In order to compute the ignition delay period, dominant factors of the ignition delay period, i.e., the temperature and pressure in the combustion chamber, the gas flow characteristic and gas composition near the spark plug, and the spark energy supplied from the spark plug to the not-burnt gas mixture, are inputted. Those variables are all values at the ignition timing.

As the gas flow characteristic at the ignition timing, the turbulence intensity and turbulence scale are taken into consideration. The turbulence intensity can be given as being substantially proportional to the average piston speed that is determined depending on the engine speed and the stroke. The turbulence scale can be given as being proportional to the clearance of the combustion chamber at the ignition timing.

The ignition delay period in terms of the crank angle tends to increase on both the leaner side and the richer side with respect to the equivalence ratio of 1, and also to increase as the EGR rate increases. On the other hand, the ignition delay period decreases as the pressure and temperature of the non-burnt gas mixture at the ignition timing increases.

Accordingly, when the compression ratio of the internal combustion engine or the load is increased, the ignition delay period tends to decrease.

As the spark energy increases, the ignition delay period decreases. The spark energy is estimated from the battery voltage and the time during which current is supplied to a primary coil of an ignition coil. Also, as a more vigorous flow is generated near the electrode portion of the spark plug with the engine speed increasing, a proportion of energy which is lost to ambient gas from the energy supplied from the spark plug to the flame kernel increases, and therefore the ignition delay period tends to increase.

When the rate of heat release during the main burning period is computed, the burning mass proportion is first computed. The term "burning mass proportion" means a proportion of the mass of the burnt gas with respect to the total gas mass supplied to the cylinder, and is given as a parameter being 0 at the start of burning and 1 at the end of burning.

Once a ratio of the temperature of the not-burnt gas to the temperature of the burnt gas is given, the relationship between the burning mass proportion and a volume proportion of the burnt gas is uniquely defined.

Then, the density of the not-burnt gas, the turbulence intensity, and the laminar burning velocity are computed. The temperature, pressure and composition of the not-burnt gas are taken into consideration in the step of computing the laminar burning velocity. The laminar burning velocity tends to increase as the temperature of the not-burnt gas increases and the pressure of the not-burnt gas lowers. Further, the laminar burning velocity tends to decrease as the EGR rate increases, and also tends to decrease on both the leaner side and the richer side with respect to the equivalence ratio of about 1.

Thus, even when the EGR rate of the gas in the cylinder is changed by operating the variably setting valve mechanism and/or the EGR valve, or even when the amount of fuel injected from the fuel injection valve is changed, the main burning period can be accurately predicted taking into account change of the gas composition.

From the laminar burning velocity thus computed, the turbulent burning velocity is computed in consideration of an influence of the turbulence intensity. The turbulent burning velocity can be obtained as the product of the laminar burning velocity, the turbulence intensity, and the experiential constant of the turbulence burning velocity.

The turbulence intensity is usually regarded to be proportional to the average piston speed. In some internal combustion engines, however, a swirl and/or a tumble is intentionally formed in the gas flow inside the combustion chamber to intensify the turbulence in the cylinder. In such a case, a ratio of the turbulence intensity to the average piston speed is modified. From the viewpoint of computation, a change amount of the ratio of the turbulence intensity to the average piston speed is handled as being equivalent to a change amount of the experiential constant of the turbulence burning velocity.

In the step of computing the turbulence burning velocity, therefore, influences of the swirl and the tumble can be taken into consideration by substituting them for the modification of the experiential constant of the turbulence burning velocity. The experiential constant of the turbulence burning velocity is set to an optimum value based on data obtained using an actual engine in advance.

In the main burning period, particularly in the initial stage of burning, the flame surface area is increased because a flame spreads over the whole of the combustion chamber as the burning progresses. However, the flame soon reaches the piston wall surface or the cylinder wall surface, whereby the flame propagation is blocked and the flame surface area is then reduced.

Such change of the flame surface area greatly affects the profile of the rate of heat release during the main burning period. The flame surface area is obtained by, on an assumption that the flame propagates substantially in the spherical form from the spark plug, deciding a flame position at which the volume proportion of the burnt gas is satisfied, and computing the area based on the decided frame position and the shape of the combustion chamber. With that computing process, the change of the flame surface area can be accurately computed in consideration of the shape of the combustion chamber and the position of the spark plug as well, which differ depending on internal combustion engines.

The rate of heat release with the burning is computed by using the density of the not-burnt gas, the amount of heat generated by the not-burnt gas, the turbulence burning velocity, and the flame surface area, which have been obtained by the above-described procedures. The rate of heat release with the burning tends to increase when any of the density of the not-burnt gas, the amount of heat generated by the not-burnt gas, the turbulence burning velocity, and the flame surface area increases. This computing process enables the change of the rate of heat release during the main burning period to be accurately computed in consideration of the shape of the combustion chamber and the operating conditions of the internal combustion engine as well.

In step 106, the numerical simulator 51 computes a heat loss through wall surfaces. When the heat loss through wall surface is computed, the wall surface temperature is first inputted. Then, the area of the wall surfaces of the combustion chamber surrounded by the cylinder and the piston is computed depending on the crank angle. The amount of heat transferred between the gas in the cylinder and the wall surfaces is greatly affected by the gas flow in the cylinder. To take into account such an influence, the average piston speed is computed which depends on the engine speed and the stroke.

A heat transfer rate to the wall surfaces is computed in consideration of the average piston speed and the pressure and temperature in the cylinder. The heat transfer rate to the wall surfaces per unit time tends to increase as the average piston speed increases.

The heat loss through the wall surfaces is computed in consideration of the heat transfer rate to the wall surfaces, the surface area of the combustion chamber, and the wall surface temperature. The amount of heat transferred between the gas in the cylinder and the wall surface is increased as the difference between the gas temperature in the combustion chamber and the wall surface temperature increases.

When the spark is ignited much earlier than the MBT, the heat loss through the wall surfaces is increased with an abrupt rise of the pressure and temperature of combustion gas. With that computing process, the cylinder pressure can be accurately computed in consideration of the heat loss through the wall surfaces as well, which is changed depending on spark advances set different from each other.

In such a way, the changes of the pressure and temperature in the cylinder can be accurately computed in step 107 based on the above-described variables, i.e., the change rate of the cylinder volume, the change rate of the gas mass in the cylinder during the gas exchange process, the rate of heat release with the burning, and the heat loss through the wall surfaces.

Then, in step 108, the numerical simulator 51 computes a knock reaction progress variable. Details of manners for computing the knock reaction progress variable and detecting the occurrence of knock will be described below with reference to FIGS. 6A and 6B. Each of FIGS. 6A and 6B shows two typical examples in one of which knock occurs and in the other of which knock does not occur.

Figure 6A:
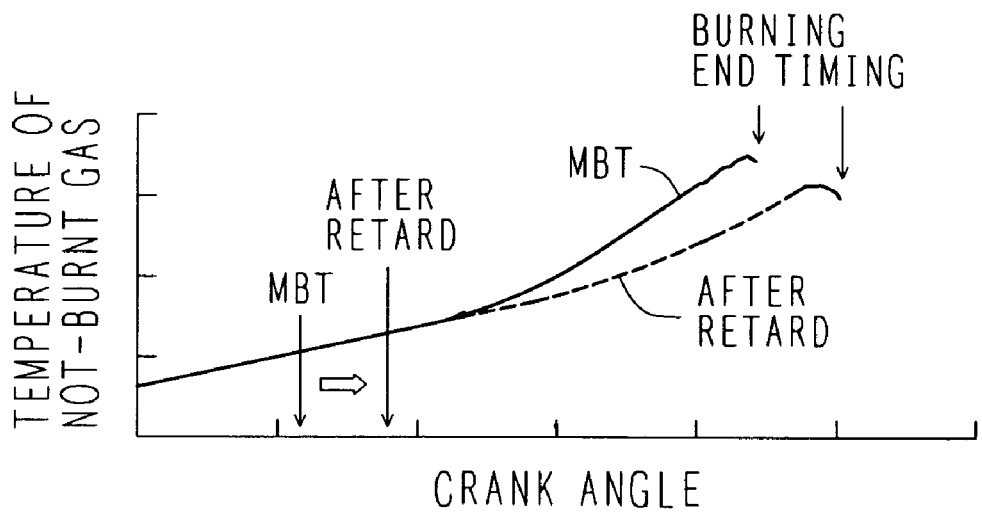
FIG. 6A is a graph showing change of temperature of not-burnt gas.
Figure 6B:
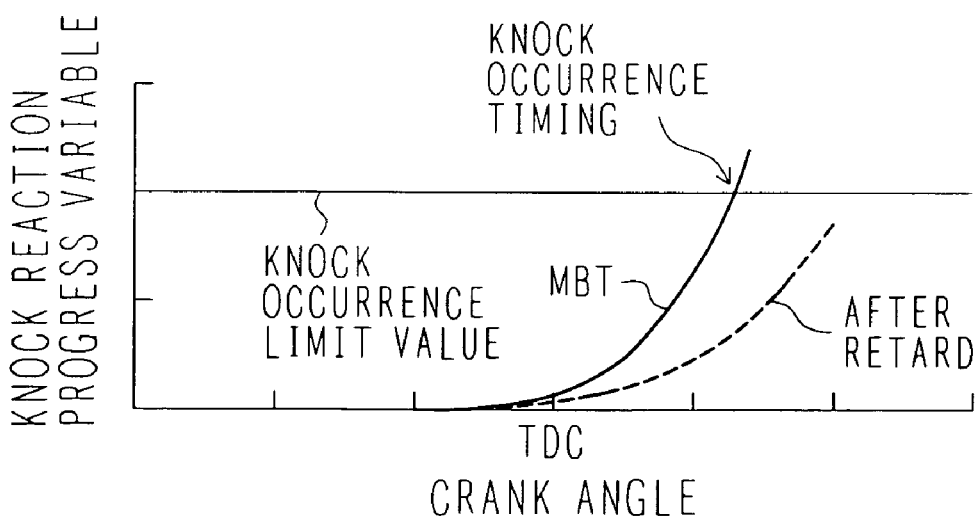
FIG. 6B is a graph showing a knock reaction progress variable.

More specifically, in FIG. 6A, a solid line represents change of the temperature of the not-burnt gas until the end of burning when the ignition timing is set to the MBT. Also, in FIG. 6B, a solid line represents change of the knock reaction progress variable until the end of burning when the ignition timing is set to the MBT.

In the step of computing the knock reaction progress variable, the occurrence of knock is determined depending on whether the knock reaction progress variable reaches a knock occurrence limit value until the end of burning. When the knock reaction progress variable reaches the knock occurrence limit value until the end of burning as indicated by the solid line in FIG. 6B, it is determined that knock occurs. Then, in such a case, a process of computing a knock limit spark advance is executed.

In FIG. 6A, a broken line represents change of the temperature of the not-burnt gas until the end of burning when the ignition timing is retarded from the MBT to the knock limit spark advance. Also, in FIG. 6B, a broken line represents change of the knock reaction progress variable until the end of burning corresponding to the change of the temperature of the not-burnt gas represented by the broken line in FIG. 6A. As seen from FIG. 6B, when the ignition timing is retarded, the knock reaction progress variable does not reach the knock occurrence limit value until the end of burning. In this case, the retarding process is brought to an end at once and the ignition timing is set to the knock limit spark advance.

The term "knock reaction progress variable" means a value resulting from integrating a reciprocal number of the reaction time, which is computed in consideration of the cylinder pressure, the temperature of the not-burnt gas, the octane number of fuel, and the experiential constant of knock sensitivity, over a time from the start of compression of the not-burnt gas. The reaction time tends to shorten as the pressure increases, as the temperature of the not-burnt gas rises, and as the octane number of fuel decreases. As the reaction time shortens, an increasing rate of the knock reaction progress variable increases and the knock is more apt to occur. Also, the knock is more apt to occur when a compression time of the not-burnt gas is prolonged by reducing the engine speed or advancing the ignition timing.

(Production of Map)

Figure 7:
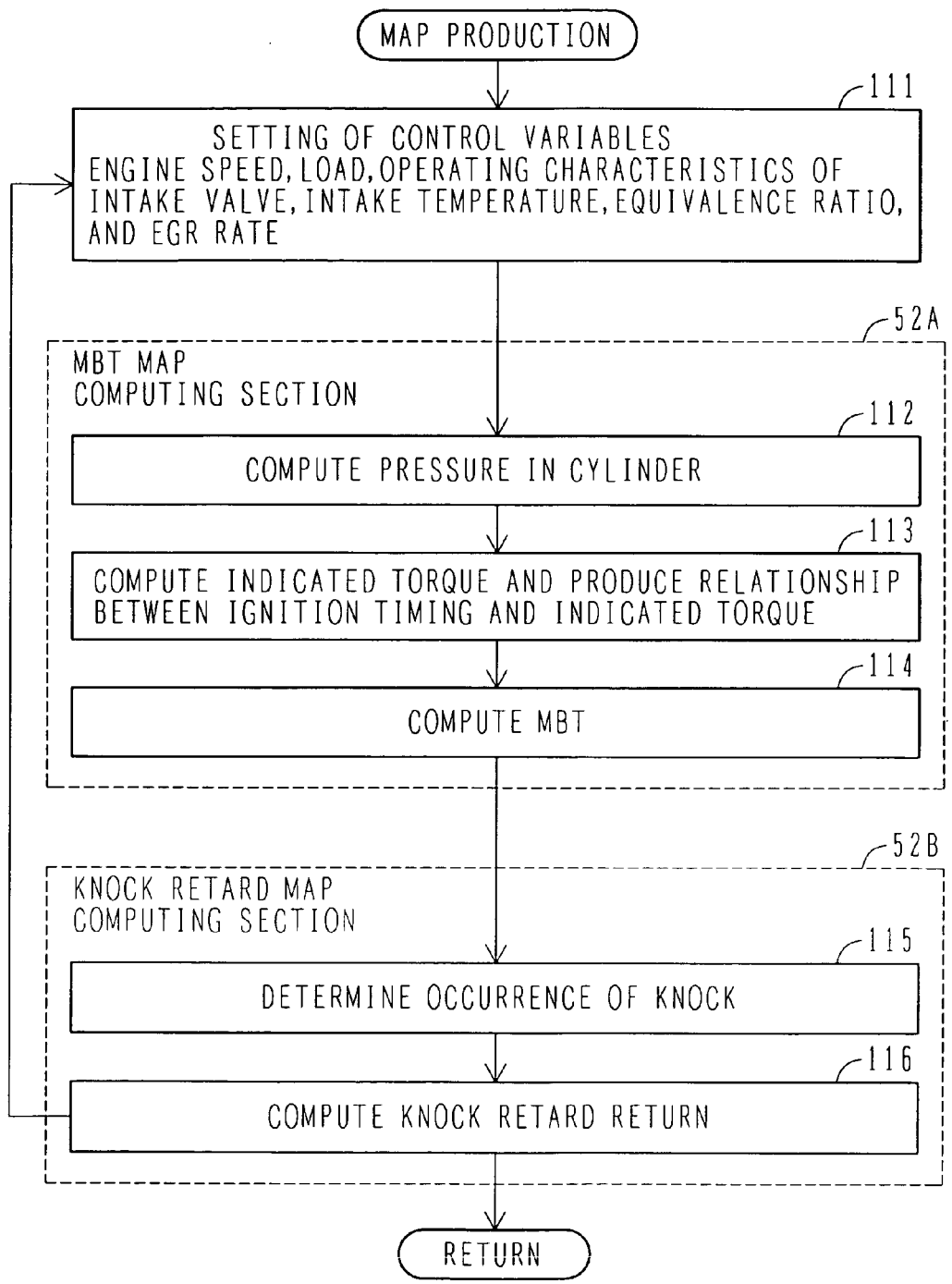
FIG. 7 is a flowchart showing one embodiment of a process for producing a map in the production machine of spark advance control logic according to the present invention.

A process of producing the map data for the MBT and the knock retard by the map producing unit 52 will be described below with reference to FIG. 7.

In the map producing process, control variables are first set in step 111. Regarding the control variables (modification variables) in this embodiment, the valve opening phase of the intake valve, the intake temperature, the equivalence ratio, and the external EGR rate are selected as factors affecting the MBT or the knock retard.

For each of the control variables, maximum and minimum values in an allowable range of each control variable and typical points within the allowable range are set. The maximum and minimum values which can be taken by each control variable are selected so as to include all the operating conditions that are supposed in the internal combustion engine 10. Further, the number of typical points is decided depending on the accuracy demanded for control of the ignition timing.

Then, based on the thus-set control variables, the cylinder pressure is computed in step 112. The computation of the cylinder pressure is preferably performed at intervals within 1 degree of the crank angle so as to obtain the cylinder pressure in each of the intake/exhaust stroke, the compression stroke, the burning stroke, and the expansion stroke.

In step 113, the indicated torque is computed based on the relationship between the computed cylinder pressure and the cylinder volume.

Figure 8A:
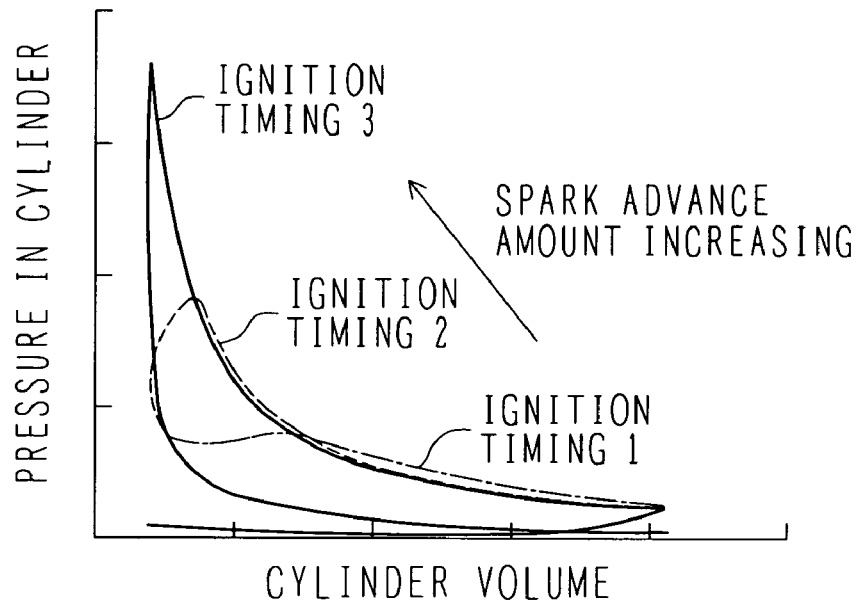
FIG. 8A is a graph showing the relationship between a cylinder volume and a pressure in the cylinder pressure at three ignition timings differing from one another.

FIG. 8A shows the relationship between the cylinder volume and the cylinder pressure at three different ignition timings 1, 2 and 3. The area within an enclosed curve obtained from the pressure versus volume relationship in the cylinder corresponds to the indicated torque that can be applied to the exterior from the internal combustion engine 10 per cycle. An enclosed curve appearing in the intake/exhaust stroke represents negative work, i.e., a pump loss.

With the indicated-torque computing process in this embodiment, the indicated torque generated by the internal combustion engine equipped with the variably setting intake valve mechanism can be accurately computed in consideration of change of the pump loss as well, which is resulted when the valve opening phase of the intake valve 19 is made variable.

The relationship between the ignition timing and the indicated torque is obtained by executing the above-described computation of the indicated torque for all of the selected typical ignition timings.

Figure 8B:
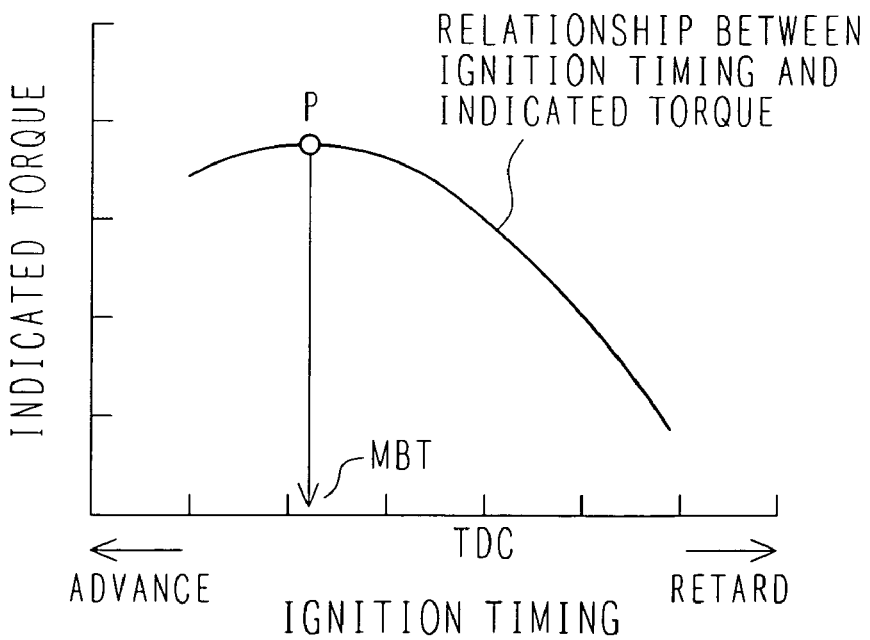
FIG. 8B is a graph showing the relationship between the ignition timing and indicated torque.

In step 114, the map producing unit 52 computes the MBT. The relationship between the ignition timing and the indicated torque, shown in FIG. 8B, is obtained by setting the typical ignition timings to a plurality of points and computing the corresponding torque.

The relationship between the ignition timing and the indicated torque is changed depending on not only the shape of the internal combustion engine, but also the operating conditions of the internal combustion engine. By setting the typical ignition timings between 60 degree before the compression top dead center (TDC) and the compression top dead center, however, one peak P generally appears in the relationship between the ignition timing and the indicated torque. The ignition timing indicating the maximum indicated torque is then selected as the MBT by using the relationship between the ignition timing and the indicated torque.

In order to reduce a computation load, the MBT may be obtained by approximating the relationship between the ignition timing and the indicated torque, which has been obtained for each of at least three points, with a curve having second or higher order, and by setting a maximum value of the curve to the MBT.

The number of points for the typical ignition timings and the number of orders of the approximation curve are decided depending on the demanded MBT accuracy. The MBT accuracy tends to increase as the number of points for the typical ignition timings and the number of orders of the approximation curve increase.

With this embodiment, the indicated torque available in the internal combustion engine 10 when the ignition timing is set to the MBT can also be computed at the same time as the computation of the MBT with high accuracy.

The above-described steps 112-114 constitute an MBT flap computing section 52A.

Then, in step 115, it is determined whether knock occurs when the ignition timing is set to the MBT that has been obtained in step 114. If knock occurs, a knock retard is computed in step 116 through similar procedures to those used for computing the knock reaction progress variable (i.e., step 108 in FIG. 3) in the numerical simulation 51.

Those steps 115 and 116 constitute a knock retard map computing section 52B.

Respective map data of the MBT and the knock retard are produced by executing the above-described steps for each of the typical points set for all the control variables.

In this embodiment, the MBT map and the knock retard map are separately produced as maps for controlling the ignition timing (spark advance), and a regression model is produced for each of those maps. In computing the ignition timing, both the MBT and the knock retard are computed and the ignition timing is given as the sum of the computed MBT and knock retard.

The MBT is greatly affected by the turbulence intensity, while the knock is a phenomenon that is substantially decided depending on the temperature history of the gas in the cylinder. The map data can be more accurately approximated by producing the MBT map and the knock retard map separately from each other, and by approximating each of those maps with a regression model.

(Production of Regression Model)

Figure 9:
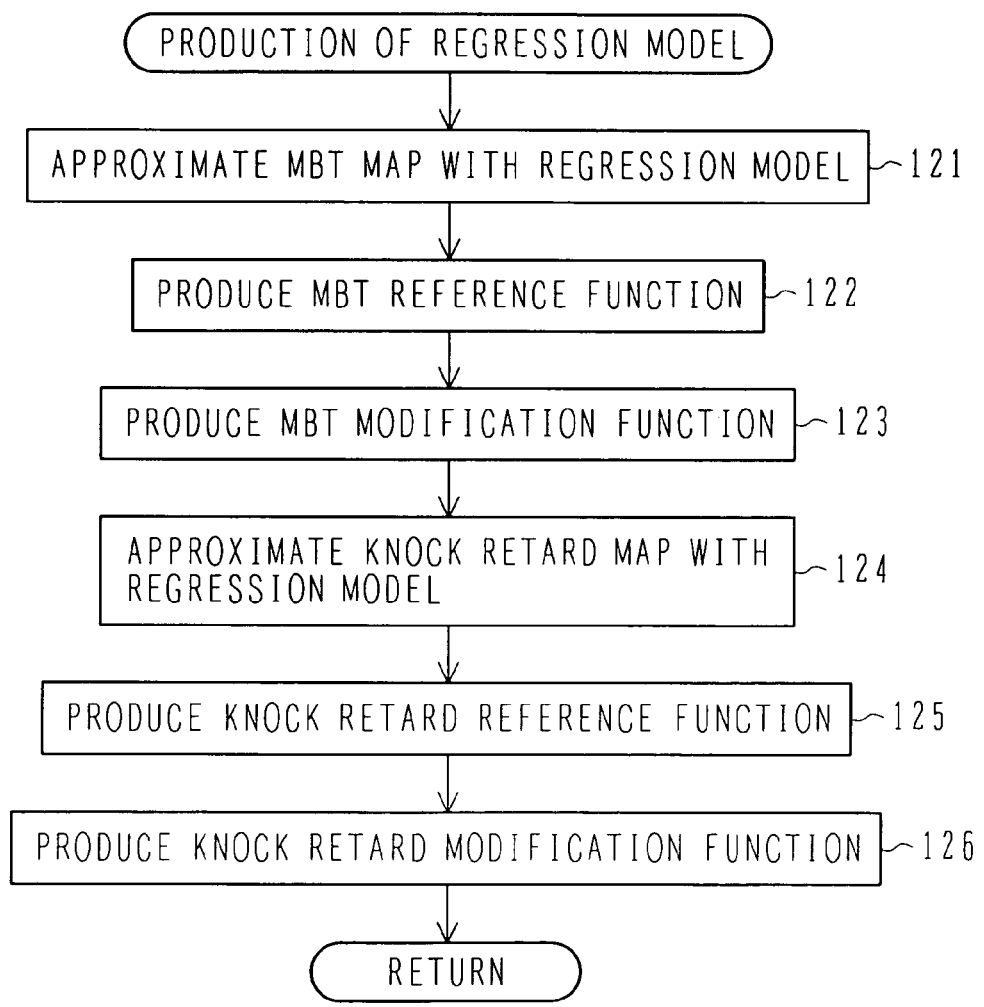
FIG. 9 is a flowchart showing one embodiment of a process for producing a regression model in the production machine of spark advance control logic according to the present invention.

A process of producing the regression model by the regression model producing unit 53 will be described below with reference to FIG. 9.

The regression models are produced for two kinds of map data, i.e., the MBT map data and the knock retard map data.

In this embodiment, the MBT map data is first approximated in step 121 with a triple and third-degree polynominal given by the following formula (1):

$$y = A0 + A1x1 + A2x1^2 + A3x1^3 + A4x2 + A5x2^2 + A6x2^3 + A7x1x2 + A8x1^2x2 + A9x1x2^2 + A10x3 + A11x3^2 + A12x3^3 + A13x1x3 + A14x2x3 + A15x1^2x3 + A16x2^2x3 + A17x1x3^2 + A18x2x3^2 + A19x1x2x3 \quad (1)$$

A dependent variable y represents the MBT, and $x1$, $x2$ and $x3$ are independent variables constituting the MBT map data. $A0$ to $A19$ are partial regression coefficients representing the degrees of influences of respective terms upon y.

The above triple and third-degree polynominal is constituted as follows. $A0$ provides a value of y when all values of $x1$, $x2$ and $x3$ are 0. $A1$ to $A3$ are terms including only $x1$. $A4$ to $A6$ are terms including only $x2$. $A7$ to $A9$ are interaction terms including $x1$ and $x2$. $A10$ to $A12$ are terms including only $x3$. $A13$ to $A19$ are interaction terms including at least $x3$ combined with $x1$ or $x2$. In this embodiment, $x1$ represents the engine speed, $x2$ represents the load, and $x3$ represents one of the intake valve opening timing, the intake temperature, the equivalence ratio, and the external EGR rate.

Figure 10A:
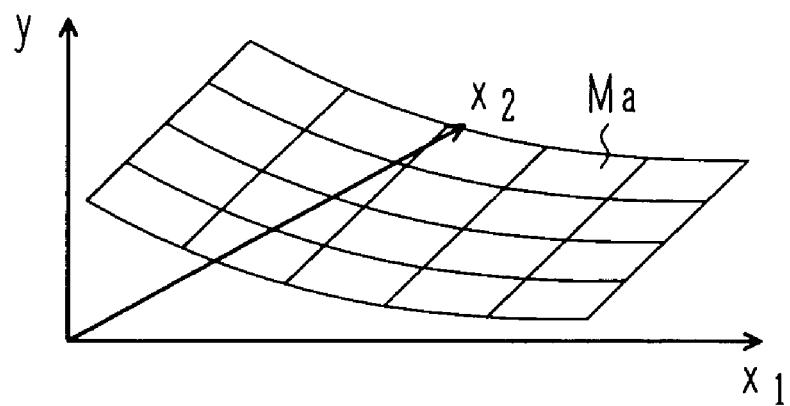
FIGS. 10A and 10B are graphs showing examples of map curved surfaces.

The relationship between a two-dimensional map curved surface and the above plural and multi-degree polynominal will be described below with reference to FIGS. 10A and 10B. In a map curved surface Ma in FIG. 10A, y decreases as $x1$ increases, and a change rate of y is not affected by a level of $x2$. In such a case, an influence upon y can be expressed by the sum of a polynominal including only $x1$ and a polynominal including only $x2$.

Figure 10B:
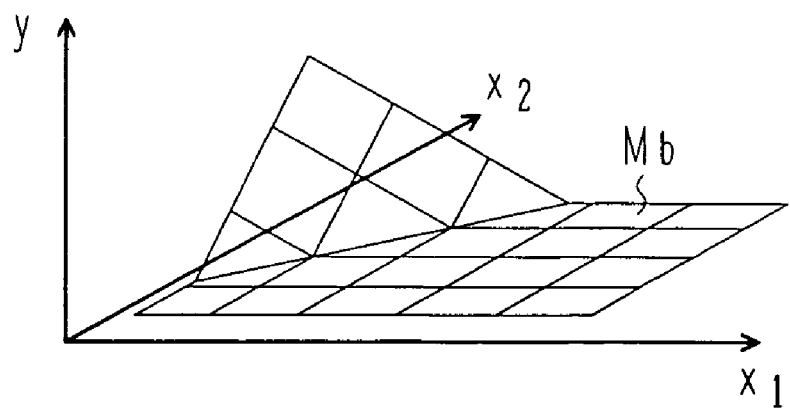

On the other hand, in a map curved surface Mb in FIG. 10B, the degree of influence of $x1$ upon y differs depending on a level of $x2$. In such a case, the influence upon y cannot be expressed by the sum of a polynominal including only $x1$ and a polynominal including only $x2$.

To accurately approximate the map curved surface Mb, an interaction term expressed by the product of $x1$ and $x2$ has to be considered in the regression model in addition to a polynominal including only $x1$ and a polynominal including only $x2$. That relationship between the map data and the regression model holds even when the variables $x1$, $x2$ and $x3$ are replaced with one another.

In general, the MBT is largely changed with respect to the engine speed and the load. The reason is that noted correlation exists between the MBT and the burning velocity, and the burning velocity is greatly affected by the pressure and temperature in the cylinder and the turbulence intensity.

Accordingly, when the MBT two-dimensional map with $x1$ representing the engine speed and $x2$ representing the load is approximated by using the regression model, the interaction term including $x1$ and $x2$ has to be taken into consideration.

On the other hand, knock is more apt to occur under conditions of high loads and low engine speeds, but does not occur at high engine speeds. Therefore, the knock retard map usually has values only in a region of high loads and low engine speeds, and shows 0 in the other regions.

To accurately approximate such a knock retard map, the interaction term including the engine speed $x1$ and the load $x2$ has to be considered in the regression model in addition to the term including only the engine speed $x1$ and the term including only the load $x2$.

For the reasons mentioned above, in this embodiment, the reference function is given as a function expressed by the term including only $x1$, the term including only $x2$, the interaction term including $x1$ and $x2$, as well as $A0$.

By using that MBT reference function, the MBT reference value can be accurately computed regardless of changes in the conditions of the engine speed and the load.

In step 122, an MBT reference function is produced from the MBT regression model that has been produced in step 121. The MBT reference function is expressed by the following formula (2):

$$y0 = A0 + A1x1 + A2x1^2 + A3x1^3 + A4x2 + A5x2^2 + A6x2^3 + A7x1x2 + A8x1^2x2 + A9x1x2^2 \quad (2)$$

Then, in step 123, an MBT modification function is produced. The MBT modification function is a polynominal made up of the terms in the formula (1), which are multiplied by the partial regression coefficients $A10$ to $A19$. A modification variable $x3$ represents one of the intake valve opening timing, the intake temperature, the equivalence ratio, and the external EGR rate.

In some of internal combustion engines, as described above with reference to FIGS. 4C and 4D, the intake valve opening timing is advanced to set an overlap period between the intake period and the exhaust period such that the burnt gas in the cylinder is caused to flow back toward the intake pipe for supply into the intake pipe again.

In the case of using the intake valve opening timing as the modification variable $x3$ in such an internal combustion engine, the MBT modification function is produced as follows.

When the intake valve opening timing is advanced, a proportion of the burnt gas in the cylinder is increased and the burning velocity is reduced. Therefore, the MBT usually tends to advance as the intake valve opening timing is advanced to increase the overlap period.

Even with the same overlap period, as the engine speed reduces, an actual time of the overlap period is increased and so is the proportion of the burnt gas supplied to the cylinder. Accordingly, the influence of the overlap period upon the MBT differs depending on a level of the engine speed.

As understood from the above, an interaction term including the engine speed $x1$ and the intake valve opening timing $x3$ has to be taken into consideration in order to accurately approximate the influence of the intake valve opening timing upon the MBT by using the regression model.

Further, even with the same overlap period, as the pressure in the intake pipe lowers, the amount of the burnt gas spit back into the intake pipe is increased and so is the proportion of the burnt gas supplied to the cylinder. Accordingly, the influence of the overlap period upon the MBT also differs depending on the pressure in the intake pipe, i.e., a level of the load.

Thus, an interaction term including the load $x2$ and the intake valve opening timing $x3$ has to be taken into consideration in order to accurately approximate the influence of the intake valve opening timing upon the MBT by using the regression model.

For the reasons mentioned above, in this embodiment, the modification function is given as a function expressed by the term including only x3, the interaction term including x3 and x1, and the interaction term including x3 and x2.

By employing that MBT modification function, the MBT modification value can be accurately computed even when the modification variable are changed in various ways.

In step 123, an MBT modification function is produced from the MBT regression model that has been produced in step 121. At that time, the MBT modification function is similarly produced for each of the intake temperature, the equivalence ratio, and the EGR rate in addition to the intake valve opening timing. The MBT modification function is expressed by the following formula (3):

$$\Delta y(x1, x2, x3) = A10x3 + A11x32 + A12x33 + A13x1x3 + A14x2x3 + A15x12x3 + A16x22x3 + A17x1x32 + A18x2x32 + A19x1x2x3 \quad (3)$$

Subsequent to the above-described production of the MBT reference function and the MBT modification function, the knock retard map is approximated with a regression model in steps 124 to 126. A process of producing the regression model, a process of producing a knock retard reference function, and a process of producing a knock retard modification function are the same as those for the MBT.

(Computation of Spark Advance)

A spark advance computing process executed by the spark advance computing section 60 in the ECU 29 will be described in detail with reference to FIG. 11.

The spark advance computing section 60 in the ECU 29 comprises an MBT computing section 60A and a knock retard computing section 60B. The MBT computing section 60A stores the reference function for the MBT and the respective modification functions for the various modification variables, while the knock retard computing section 60B stores the reference function for the knock retard and the respective modification functions for the various modification variables. The operating conditions, such as the engine speed, the load, the characteristic values in operation of the intake valve, the intake temperature, the equivalence ratio, and the EGR rate, are inputted to both the computing sections 60A and 60B.

The functions stored in the MBT computing section 60A and the knock retard computing section 60B include the MBT reference function, the MBT modification functions, the knock retard reference function, and the knock retard modification functions which have been produced by the regression model producing unit 53 (in steps 121 to 126 in FIG. 9), as well as the partial regression coefficients contained in those functions.

Figure 11:
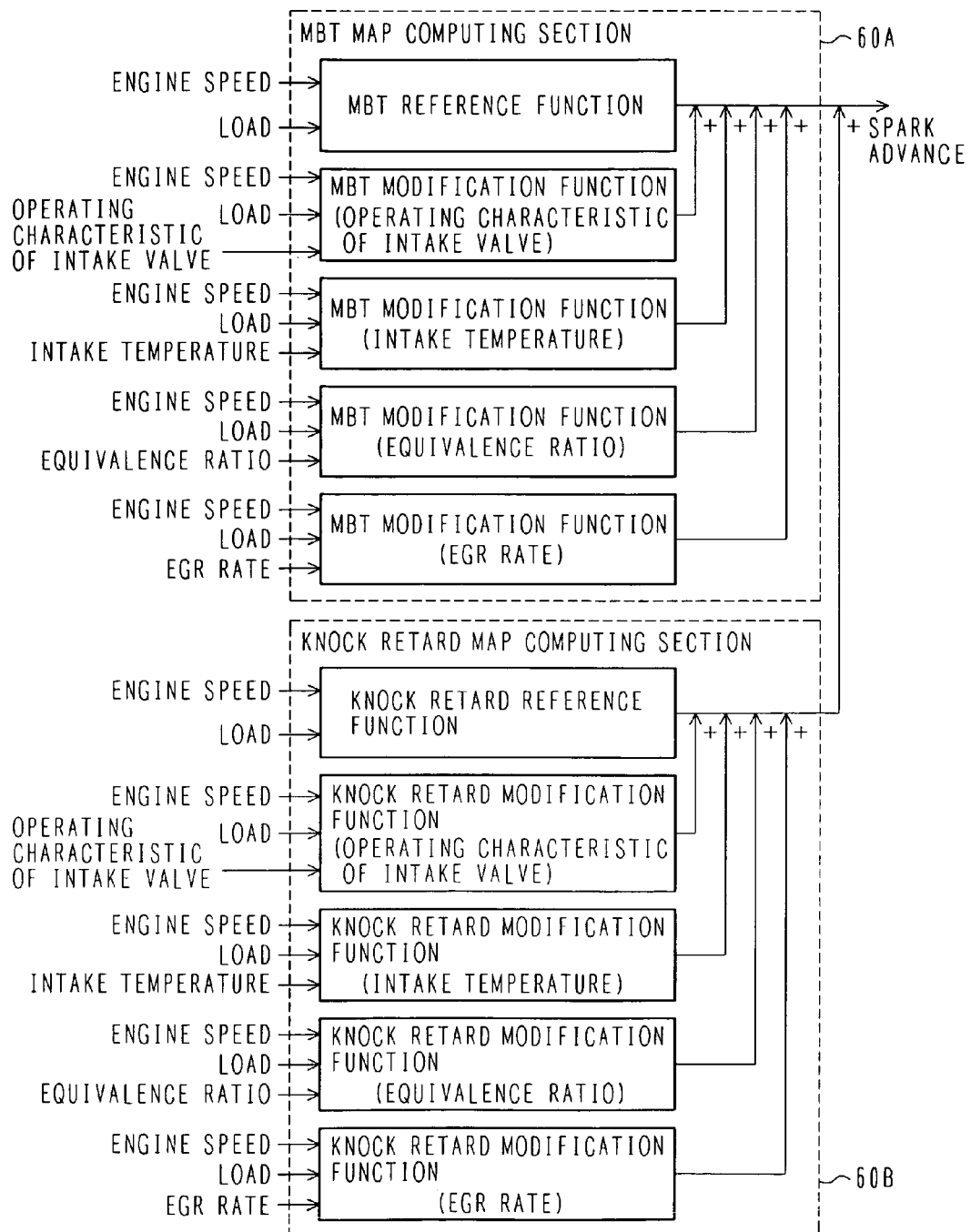
FIG. 11 is a block diagram showing one embodiment of the spark advance controller according to the present invention.

In the MBT computing section 60A and the knock retard computing section 60B, as shown in FIG. 11, the MBT and the knock retard are each given as the total sum of respective modification values determined for the modification variables. This means that influences of the interaction terms representing the interactions between the modification variables are ignored. In other words, looking at the terms including two variables, the following interaction terms are omitted:

(intake valve opening timing×intake temperature),
(intake valve opening timing×equivalence ratio),
(intake valve opening timing×external EGR rate), (intake temperature×equivalence ratio),
(intake temperature×external EGR rate), and
(equivalence ratio×external EGR rate) (4)

Figure 12:
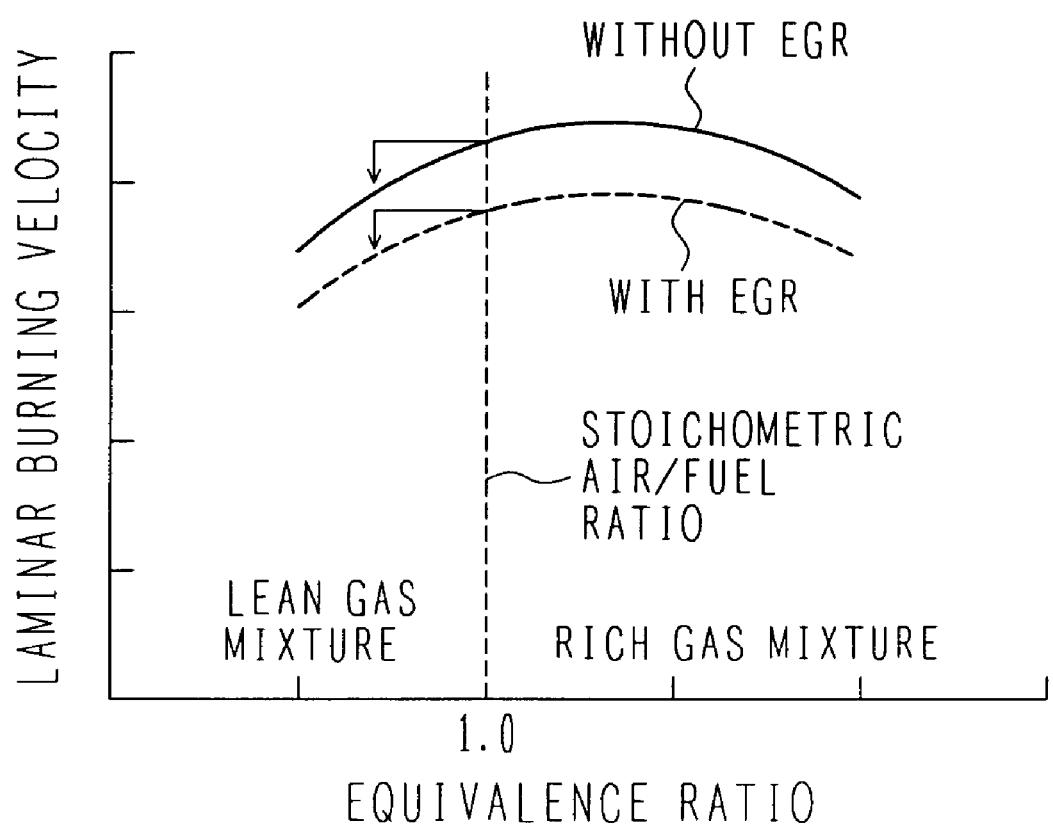
FIG. 12 is a graph showing the relationship between an equivalence ratio and a laminar burning velocity under different conditions of an EGR rate.

FIG. 12 is a graph showing the relationship between the equivalence ratio and the laminar burning velocity under different conditions of the EGR rate (i.e., with EGR and without EGR). The laminar burning velocity is one of the most important affecting factors in the process of deciding the MBT. As shown in FIG. 12, the laminar burning velocity takes a maximum value under the condition of the equivalence ratio being slightly richer than 1.0, and it reduces in either side richer or leaner than such an equivalence ratio. Also, with the supply of EGR gas, the laminar burning velocity tends to reduce at any value of the equivalence ratio.

As seen from FIG. 12, a reduction amount of the laminar burning velocity resulting when the equivalence ratio is controlled to shift from the condition of the stoichiometric air/fuel ratio toward the lean side without the EGR is almost the same as that of the laminar burning velocity resulting when the EGR gas is supplied to the cylinder.

From such a result, it can be said that the MBT modification value used when the equivalence ratio is controlled to shift toward the lean side is not greatly affected by a level of the EGR. Accordingly, the influence of the interaction term for the equivalence ratio and the EGR rate can be ignored in the MBT modification functions.

The MBT modification value used when the intake valve opening timing is advanced can be substantially explained based on the proportion of the burnt gas supplied to the cylinder. This is similarly applied to the relationship between the intake valve opening timing and the equivalence ratio or between the intake valve opening timing and the external EGR rate.

In this way, a total MBT modification value for all the modification variables is computed as the total sum of respective MBT modification values obtained for the modification variables, as expressed by the following formula (5):

$$\text{total MBT modification value} = \Delta y(x1, x2, \text{intake valve opening timing}) + \Delta y(x1, x2, \text{intake temperature}) + \Delta y(x1, x2, \text{equivalence ratio}) + \Delta y(x1, x2, \text{external EGR rate}) \quad (5)$$

Thus, by employing the manner of ignoring the interaction terms representing the interactions between the modification variables, the computation load can be cut without reducing the accuracy in the MBT computing process. The above-described manner is similarly applied to the process of computing the knock retard map.

(Variations of Controller of Present Invention)

While the embodiment has been described above as approximating each of the MBT and the knock retard by using the regression model in the form of a triple and third-degree polynominal, the polynominal constituting the regression model is not limited to that one. The accuracy in approximation of the map data is improved by increasing the number of degrees of the regression model. Therefore, a regression model with higher degrees may be prepared, and all the interaction terms representing the interactions between the modification variables may be taken into consideration. The higher degree and the increased number of the interaction terms, however, increase the computation load. For that reason, the number of degrees and the number of the interaction terms are decided depending on the demanded accuracy in computation of the spark advance.

The partial regression coefficient by which the term in the regression model is multiplied represents the degree of influence of the relevant term upon the dependent variable. The independent variables x1, x2 and x3 have different dimensions from one another. By normalizing a range of allowable value of each independent variable and setting it as a parameter having a value of, e.g., from −1 to +1, therefore, the magnitudes of the partial regression coefficients obtained with such normalization can be evaluated on the equivalent basis as contribution rates to the respective terms.

In producing the regression model, a regression model having the number of computing steps cut to fall within a range satisfying the demanded accuracy in computation can be decided in a trial-and-error way by repeating steps of computing the partial regression coefficients with the regression model in the form of a polynominal having sufficiently high degree in advance, and omitting the term with a smaller contribution rate based on the computed magnitudes of the partial regression coefficients.

Also, while in the embodiment one regression model is produced for each of the MBT and the knock retard with respect to all the operating conditions, the present invention is not limited to that mode. For example, the map data can be approximated with higher accuracy by subdividing the map data for each of operating ranges and producing a regression model per subdivided group of the map data.

Further, while in the embodiment the intake valve opening timing, the intake temperature, the equivalence ratio, and the external EGR rate are set as the modification variables, the present invention is not limited to that setting. The present invention can be applied to all control parameters affecting the temperature, pressure, composition, and flow of the gas in the cylinder, such as the cooling water temperature and the opening of a tumble control valve, without substantially modifying the above-described embodiment.

(Summary of Advantages of the Invention)

(1) After computing map data for spark advance control by the numerical simulator simulating an internal combustion engine, the map data for spark advance control is approximated with a regression model, and the spark advance is computed by using the regression model depending on the detected operating conditions. The ECU is therefore required neither to store any maps, nor to compute physical models having a large computation load. Hence, the memory capacity of the ECU can be reduced in comparison with that required in the case of a map search, and the computation load of the ECU can also be reduced in comparison with that required in the case of directly computing the physical models.

(2) The regression model is a polynominal made up of at least one of a term including only the engine speed, a term including only the load, a term including only the modification variable, an interaction term including the engine speed and the load, an interaction term including the modification variable and the engine speed, an interaction term including the modification variable and the load, and an interaction term including the engine speed, the load and the modification variable. The term including only one variable is able to represent the degree of influence of the relevant term upon the spark advance regardless of the other variables. The interaction term including two or three variables is able to represent the degree of influence of one term upon the spark advance when the degree of influence of the relevant one term upon the spark advance is changed with a level of the other one or more variables. Thus, the spark advance can be accurately computed by setting the engine speed, the load and the modification variables as variables, and producing the regression model containing one or more of the above-mentioned terms.

(3) The regression model is divided into a reference function and a modification function, and the spark advance is given as the sum of a spark advance reference value computed by the reference function and a spark advance modification value computed by the modification function. This eliminates the necessity of computing the spark advance reference value for each of the modification variables. Accordingly, the number of computing steps can be cut without reducing the accuracy in computing the spark advance.

(4) The reference function is a polynominal made up of at least one of the term including only the engine speed, the term including only the load, the interaction term including the engine speed and the load. The modification function is a polynominal made up of at least one of the term including only the modification variable, the interaction term including the modification variable and the engine speed, the interaction term including the modification variable and the load, and the interaction term including the engine speed, the load and the modification variable. Thus, the spark advance can be accurately computed by selecting the engine speed and the load, which greatly affects the spark advance, as the variables of the reference function.

(5) By setting an operating characteristic value of the intake valve as the modification variable and computing the spark advance modification value based on the operating characteristic of the intake valve, the spark advance can be accurately computed regardless of change in the operating characteristic of the intake valve.

(6) By setting the intake temperature as the modification variable and computing the spark advance modification value based on the intake temperature, the spark advance can be accurately computed regardless of change of the intake temperature.

(7) By setting the equivalence ratio as the modification variable and computing the spark advance modification value based on the equivalence ratio, the spark advance can be accurately computed regardless of change of the equivalence ratio.

(8) By setting the EGR rate as the modification variable and computing the spark advance modification value based on the EGR rate, the spark advance can be accurately computed regardless of change in the EGR rate.

(9) When there are a plurality of modification variables, the spark advance can be accurately computed in spite of the presence of plural modification variable by computing the spark advance modification value based on each of the modification variables and setting the total sum of the respective spark advance modification values computed for all the modification variables as a total spark advance modification value. The degree of influence of each modification variable is hardly affected depending on a level of the other one or more modification variables. Hence, the interaction term representing the interaction between the modification variables is not required to be taken into consideration, and the number of computing steps can be cut corresponding to the omission of the interaction term representing the interaction between the modification variables.

(10) Each term of the regression model is multiplied by the partial regression coefficient that is decided so as to more accurately approximate the map data, and the degree of influence of the term upon the spark advance, which is multiplied by the partial regression coefficient, is evaluated based on the magnitudes of respective absolute values of the partial regression coefficients. Then, if the degree of influence is not larger than a predetermined value, the relevant term is omitted from the regression model. Accordingly, the terms redundant from the viewpoint of the demanded accuracy of the spark advance are no longer required to be computed, and the computation load can be cut.

(11) The spark advance can be accurately computed by employing, as the reference function, a dual and third-degree polynominal in which the engine speed and the load are independent variables, and as the modification function, a triple and third-degree polynominal in which the engine speed, the load and the modification variable are independent variables.

(12) The map data for spark advance control is constituted by an MBT map and a knock retard map, and these maps are approximated with respective regression models. The MBT and the knock retard are each computed by using the corresponding regression model. Hence, the approximation accuracy of the regression model can be improved and the spark advance can be computed with higher accuracy.

(13) Corresponding to an increase of accuracy demanded in the process of computing the spark advance, the map data for spark advance control is subdivided into plural groups depending on individual operating ranges, and each subdivided group of the map data is approximated with a regression model. As a result, the approximation accuracy of the regression model can be improved and the spark advance can be computed with higher accuracy.

(14) Corresponding to an increase of accuracy demanded in the process of computing the spark advance, the number of degrees of the regression model is increased. As a result, the approximation accuracy of the regression model can be improved and the spark advance can be computed with higher accuracy.

(15) The numerical simulator comprises a unit for computing at least a cylinder volume, a unit for computing change of gas mass in the cylinder during the gas exchange process, a unit for computing heat generated in the burning process, a unit for computing a heat loss, and a unit for determining the occurrence of knock. Based on the numerical simulation described above, the numerical simulator computes the relationship between the cylinder pressure and the cylinder volume per cycle, computes indicated torque based on the relationship between the cylinder pressure and the cylinder volume, computes the MBT based on the relationship between the indicated torque and the spark advance, and computes a knock limit based on a signal from the unit for determining the occurrence of knock. Accordingly, the numerical map data for spark advance control can be computed with good accuracy.

What is claimed is:

1. A spark advance controller in an internal combustion engine, comprising means for detecting operating conditions of said internal combustion engine,
   and means for deciding a spark advance with computation using a produced regression model approximating spark advance control map data depending on the detected operating conditions,
   wherein said regression model is a polynomial made up of at least one of a term including only an engine speed, a term including only a load, at least one of a term including only a modification variable, an interaction term including the engine speed and the load, an interaction term including the modification variable and the engine speed, an interaction term including the modification variable and the load, and an interaction term including the engine speed, the load and the modification variable.

2. The spark advance controller in the internal combustion engine according to claim 1, wherein the regression model is divided into a reference function and a modification function, and the spark advance is decided as the sum of a spark advance reference value computed by the reference function and a spark advance modification value computed by the modification function.

3. The spark advance controller in the internal combustion engine according to claim 2, wherein said modification variable includes an operating characteristic value of an intake valve, and the spark advance modification value is computed based on the operating characteristic of the intake valve by using the modification function with the operating characteristic value of the intake valve set as the modification variable.

4. The spark advance controller in the internal combustion engine according to claim 2, wherein said modification variable includes an intake temperature, and the spark advance modification value is computed based on the intake temperature by using the modification function with the intake temperature set as said modification variable.

5. The spark advance controller in the internal combustion engine according to claim 2, wherein said modification variable includes an equivalence ratio, and the spark advance modification value is computed based on the equivalence ratio by using the modification function with the equivalence ratio set as the modification variable.

6. The spark advance controller in the internal combustion engine according to claim 2, wherein said modification variable includes an EGR (Exhaust Gas Recirculation) rate, and the spark advance modification value is computed based on the EGR rate by using the modification function with the EGR rate set as the modification variable.

7. The spark advance controller in the internal combustion engine according to claim 2, wherein when there are a plurality of modification variables, the spark advance modification value is computed based on each of the modification variables, and the total sum of the respective spark advance modification values computed for all the modification variables is set as a total spark advance modification value.

8. The spark advance controller in the internal combustion engine according to claim 2, wherein said reference function is defined as a dual and third-degree polynomial in which the engine speed and the load are independent variables, and said modification function is defined as a triple and third-degree polynomial in which the engine speed, the load and the modification variable are independent variables.

9. The spark advance controller in the internal combustion engine according to claim 1, wherein the spark advance is decided as the sum of an MBT (Minimum spark advance for Best Torque) computed by using an approximated MBT regression model and a knock retard computed by using an approximated knock-retard regression model.

* * * * *